United States Patent [19]

Vingtrois

[11] Patent Number: 5,666,033
[45] Date of Patent: Sep. 9, 1997

[54] CIRCUIT FOR HORIZONTAL SCANNING OF A VIDEO DISPLAY APPARATUS, PROVIDED WITH AN S CAPACITAN

[75] Inventor: Régis Vingtrois, Port en Bessin, France

[73] Assignee: U.S. Philips Corporation, New York, N.Y.

[21] Appl. No.: 715,053

[22] Filed: Sep. 17, 1996

[30] Foreign Application Priority Data

Sep. 20, 1995 [FR] France .................... 95 11035

[51] Int. Cl.$^6$ .................... H01J 29/70; H01J 29/76
[52] U.S. Cl. .................... 315/408; 315/370; 315/371
[58] Field of Search .................... 315/408, 370, 315/371

[56] References Cited

U.S. PATENT DOCUMENTS

| | | | |
|---|---|---|---|
| 4,695,774 | 9/1987 | Gent et al. | 315/408 |
| 5,155,417 | 10/1992 | Tateishi | 315/371 |
| 5,517,090 | 5/1996 | Bando | 315/370 |

FOREIGN PATENT DOCUMENTS 2655946  6/1978  Germany .

*Primary Examiner*—Theodore M. Blum
*Attorney, Agent, or Firm*—Edward W. Goodman

[57] ABSTRACT

A diode modulator circuit constituted by a switch (TR) in parallel with two diodes (D1, D2) arranged in cascade in the opposite direction, to which a deflection coil (LD) in series with a first S capacitance (CS1) and a winding of a transformer (TR) is connected. A second S capacitance (CS2) in series with a thyristor (TH) is connected, at one end, to the first S capacitance and, at the other end, to the common point (PMED) of the two diodes of the modulator, and the thyristor is correctly triggered by insulating its cathode with respect to the common point (PMED) by means of a diode (D4) and by arranging a divider bridge consisting of three resistors (R1, R2, R3) between said common point (PMED) and ground, the gate-cathode space being connected to the terminals of one of the resistors (R2).

5 Claims, 1 Drawing Sheet

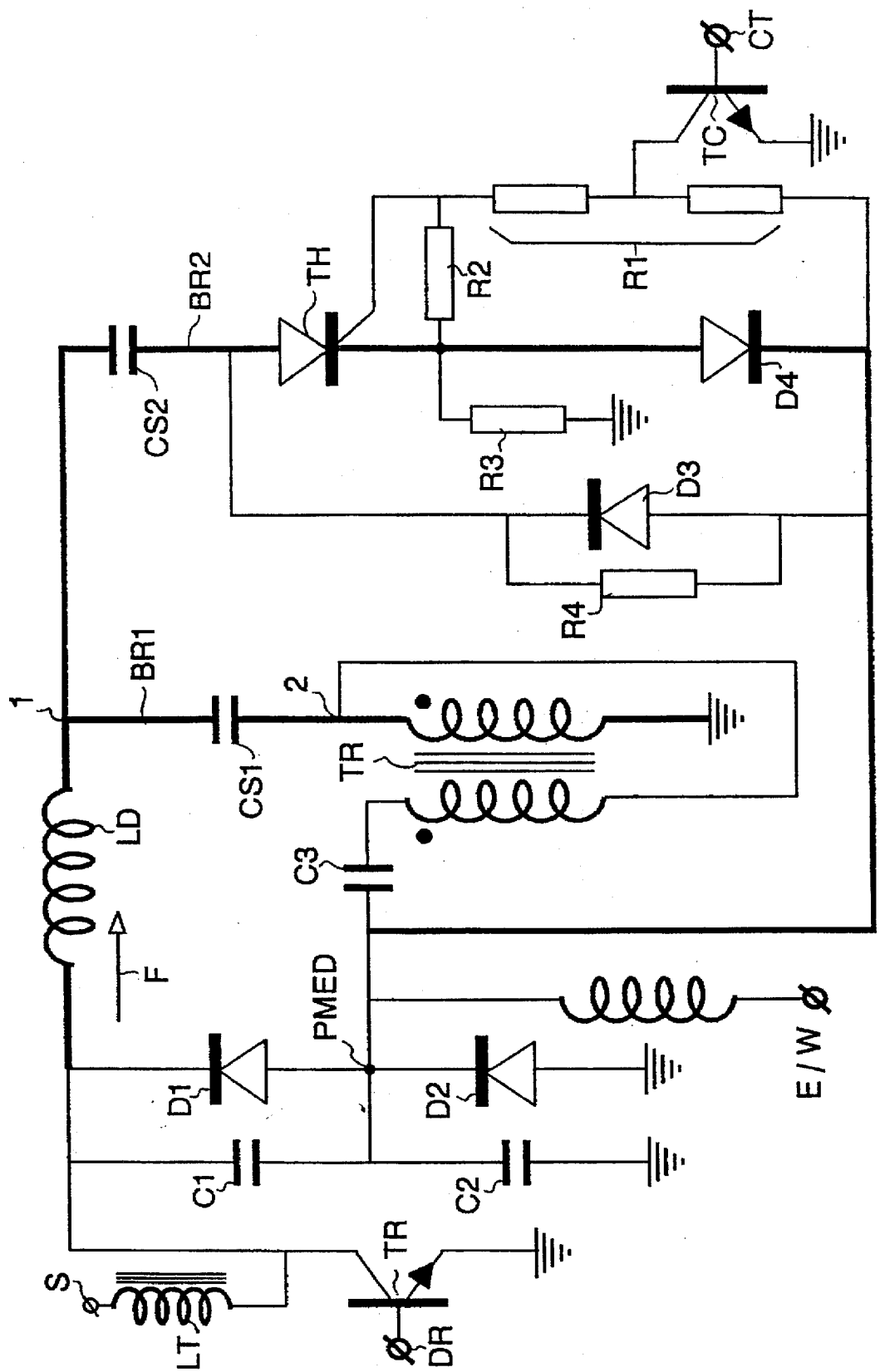

5,666,033

CIRCUIT FOR HORIZONTAL SCANNING OF A VIDEO DISPLAY APPARATUS, PROVIDED WITH AN S CAPACITAN

BACKGROUND OF THE INVENTION

1. Field of the Invention

The invention relates to a circuit for horizontal scanning, referred to as a diode modulator, for use in a video display apparatus, comprising a main semiconductor switching element, with an active terminal and a terminal connected to ground, arranged in parallel with two diodes connected in cascade in a direction opposite to the direct direction of the main switching element, provided with a first branch connected between the active terminal of the main switching element and ground, and consisting of the cascade arrangement of a deflection coil, a first S capacitance and an inductance, and provided with a second branch consisting of the cascade arrangement of an additional S capacitance and a thyristor for activating or deactivating said additional S capacitance.

The invention is, inter alia, usable for activating or deactivating an additional S capacitance for the purpose of correcting the lateral parts of a television image of the 4/3 format displayed on a 16/9 format screen, while performing simultaneous action on the scanning amplitude with the aid of a diode modulator.

2. Description of the Related Art

A horizontal scanning television circuit as described in the opening paragraph is known from the German Patent DE-A-2 655 946. In the circuit described in this document, it is possible to connect an additional S capacitance by means of an electronic switch for adapting the circuit when it is desirable to modify the line frequency (multistandard device). A problem occurs because of the presence of high DC and AC voltages at the two terminals of the S capacitor, while it is generally preferred to use at least a voltage close to ground in an electronic switch. In accordance with this document, this problem is solved by connecting the additional capacitance by means of a transformer.

SUMMARY OF THE INVENTION

It is an object of the invention to solve the same problem as that posed in the prior art by dispensing with the costly transformer.

To this end, a circuit for horizontal scanning, as set forth in the opening paragraph, is characterized in that;

in the first branch, the deflection coil is arranged between the active terminal of the main switching element and the first S capacitance, in the second branch, the additional S capacitance is connected to the common point between the deflection coil and the first S capacitance, and the cathode of the thyristor is connected, to the median common point of the two diodes of the modulator via a series diode which is connected to the cathode of the thyristor in cascade with this thyristor and with the same pass direction, a first resistor is connected between the median point and the gate of the thyristor, a second resistor is connected between the gate of the thyristor and the cathode of the thyristor, and a third resistor is connected between the cathode of the thyristor and ground.

The invention is thus based, inter alia, on the recognition that the cathode of the thyristor is insulated by means of a series diode with respect to high voltages present at the median point, which allows triggering of the thyristor by applying a pulse to its gate in connection with the line flyback (or retrace) by means of a simple resistance voltage divider.

For controlling the thyristor, the circuit advantageously comprises a control transistor whose main current path connects the gate of the thyristor to ground. The thyristor is thus controlled in an economical manner.

The circuit preferably comprises a parallel diode arranged in parallel with the assembly comprising the thyristor and the series diode, which parallel diode has a pass direction inverse to that of said assembly.

The additional S capacitance may thus be active throughout the sweep (or trace) period.

The parallel diode is advantageously shunted by a resistor. This obviates current peaks in the thyristor when starting the apparatus.

The invention also relates to a video display apparatus, provided with a circuit according to the invention.

These and other aspects of the invention will be apparent from and elucidated with reference to the embodiments described hereinafter.

BRIEF DESCRIPTION OF THE DRAWING

In the drawing:

The sole FIGURE shows a diagram of a circuit according to the invention.

DESCRIPTION OF THE PREFERRED EMBODIMENT

The horizontal scanning television circuit, referred to as diode modulator, shown in the FIGURE, comprises a main switching element, here a transistor TR of the NPN type, controlled in known manner at the line frequency by a signal applied to an input DR, with an active terminal constituted by its collector, and a terminal connected to ground, namely, its emitter. The collector of this transistor is connected to a positive power supply source S by means of the primary winding LT of a known transformer, referred to as "line transformer", the other windings of which are not shown. Two diodes D1 and D2, connected in cascade, with a common point PM ED, in a direction opposite to the direct direction of the transistor TR, are branched in parallel with the transistor TR, i.e., the cathode of D1 is connected to the collector of TR and the anode of D2 is connected to ground.

A capacitance C1 and a capacitance C2, referred to as "retrace" capacitors, are connected in parallel with D1 and D2, respectively. It is known that the capacitance C2 may alternatively be arranged between the collector of TR and ground.

A first branch BR1, connected between the collector of transistor TR and ground, comprises a cascade arrangement of a deflection coil LD and a first S capacitance CS1 connected, at point 2, to an inductance constituted by a winding of a transformer TR. The deflection coil LD is arranged between the collector of the transistor TR and the capacitance CS1. Another winding, referred to as the secondary winding of the transformer TR, is, in the present case, connected to the point 2, in series with the primary winding. Its end, where the highest voltage is produced, is connected, by means of a capacitance C3, to the point PMED. Alternatively, the secondary coil may be connected to ground instead of in series with the primary winding (the number of turns would then be different). The capacitance C3 may be arranged at the one or the other side of the secondary winding. In another variant, a simple inductance is sometimes used instead of the transformer, and the capacitance C3 is then connected to point 2. All these variants are compatible with the invention.

An input E/W allows the use, at the point PMED via a blocking inductance, of a line amplitude control voltage and a voltage modulated in the form of a parabola, referred to as "east/west correction" with which the amplitude of the current in LD can be modulated without modifying the height of the pulses in LT, i.e., without modifying the voltages generated by means of the line transformer.

The elements described so far are the conventional constituents of a known "diode modulator" arrangement and therefore need not be explained hereinafter.

A second branch BR2 comprises a cascade arrangement of an additional S capacitance CS2, a thyristor TH, which has the function of activating or deactivating this additional S capacitance CS2, and a diode D4, referred to as series diode. The capacitance CS2 is connected at one end to the common point 1 between the deflection coil LD and the capacitance CS1, and at the other end to the anode of the thyristor TH. The diode D4 has its anode connected to the cathode of the thyristor TH and its cathode connected to the point PMED.

A first resistor R1 is connected between the median point PMED and the gate of the thyristor; a second resistor R2 is connected between the gate and the cathode of the thyristor; and a third resistor R3 is connected between the cathode of the thyristor and ground.

The resistor R1 is constituted by two parts with a junction point. To block the thyristor when the capacitance CS2 is not to be activated, the main current path of a control transistor TC is connected between the junction point of the resistor R1 and ground. This transistor is turned on or off by means of a signal applied to an input CT. Alternatively, it may also be connected directly to the gate of the thyristor.

A diode D3, referred to as parallel diode, is connected in parallel with the assembly comprising the thyristor TH and the series diode D4, the parallel diode D3 having a pass direction opposite to that of this assembly, i.e., its cathode is connected to the anode of the thyristor and its anode is connected to the cathode of D4. The parallel diode D3 is shunted by a resistor R4.

This arrangement operates as follows:

when the transistor TC is turned on under the control of the voltage CT, it imposes the voltage of ground in the middle of R1, and the cathode of TH is also connected to ground by R3, consequently, the thyristor is blocked (the point PMED always holds a positive voltage, and therefore, the diode D4 can only conduct when the cathode of TH is even more positive, which is not the case).

when the transistor TC is turned off, it doesn't impose any voltage in R1. When a pulse is produced at PMED because of the line retrace, it is applied to the assembly of series-arranged resistors R1, R2, R3 which constitute a voltage divider. The diode D4 is still blocked. The voltage between the gate and the cathode reaches the value Vg=Vr (R2/R1+R2+R3) in the middle of the duration of the line retrace pulse, with Vr being the maximum voltage of the pulse at PMED. The value of the resistors is determined to trigger ON the thyristor at this instant. This instant is favorable because the voltage at the terminals of the assembly {thyristor TH+diode D4} is low at that instant. The thyristor and the diode thus become conducting during the second half of the retrace period and then during the first half of the trace period, with the current in LD having the direction indicated by the arrow F. Subsequently, the diode D3 passes the current during the second half of the trace period, when the current changes direction.

I claim:

1. A circuit for horizontal scanning, referred to as diode modulator, for use in a video display apparatus, comprising a main semiconductor switching element with an active terminal and a terminal connected to ground, arranged in parallel with two diodes connected in cascade in a direction opposite to the direct direction of the main switching element, provided with a first branch connected between the active terminal of the main switching element and ground, and consisting of the cascade arrangement of a deflection coil, a first S capacitance and an inductance, and provided with a second branch consisting of the cascade arrangement of an additional S capacitance and a thyristor for activating or deactivating said additional S capacitance, characterized in that in the first branch, the deflection coil is arranged between the active terminal of the main switching element and the first S capacitance, in the second branch
the additional S capacitance is connected to the common point between the deflection coil and the first S capacitance and, the cathode of the thyristor is connected to the median common point of the two diodes of the modulator via a series diode which is connected to the cathode of the thyristor in cascade with said thyristor and with the same pass direction, a first resistor is connected between the median point and the gate of the thyristor, a second resistor is connected between the gate of the thyristor and the cathode of the thyristor, and a third resistor is connected between the cathode of the thyristor and ground.

2. A horizontal scanning circuit as claimed in claim 1, characterized in that, for controlling the thyristor, the circuit comprises a control transistor whose main current path connects the gate of the thyristor to ground.

3. A horizontal scanning circuit as claimed in claim 1, characterized in that the circuit comprises a parallel diode arranged in parallel with the assembly comprising the thyristor and the series diode, which parallel diode has a pass direction inverse to that of said assembly.

4. A horizontal scanning circuit as claimed in claim 3, characterized in that the parallel diode is shunted by a resistor.

5. A video display apparatus, characterized in that it is provided with a circuit as claimed in claim 1.

* * * * *